April 12, 1960 C. BUFF 2,932,730

NARROW TO WIDE BAND CONVERTER

Filed Oct. 1, 1956

INVENTOR
C. BUFF
BY [signature]
ATTORNEY

United States Patent Office 2,932,730

Patented Apr. 12, 1960

2,932,730

NARROW TO WIDE BAND CONVERTER

Christopher Buff, Deer Park, N.Y., assignor to Mackay Radio and Telegraph Company, New York, N.Y., a corporation of Delaware Application October 1, 1956, Serial No. 613,082

5 Claims. (Cl. 250—8)

This invention relates to communication systems, of the type employing a plurality of different and discrete signal frequencies.

One such system is the frequency-shift telegraphy system. In this form of communication system, two frequencies are required per channel, one for "space" and the other for "mark." One such system is the Twinplex telegraphy system developed by Mackay Radio and Telegraph Co., New York, N.Y. described in the publication "Electrical Communication," March 1952 issue. Since this invention has particular utility in connection with the more common frequency-shift keying (F.S.K.) system and the Twinplex system, it will be described in conjunction therewith. However, it is applicable to any plural frequency communication system.

Twinplex is a two-channel telegraphy system in which a signalling condition, "mark" or "space," of each of two channels, is derived from a single instantaneous frequency. The Twinplex system combines two, 2 element mark-space channels to form on the frequency scale a single four-element channel. Each of the four frequencies represents one of four possible combinations of mark and space conditions. For example, the mark-mark combinations, that is, a mark for each channel, is represented by a frequency of 1950 cycles per second (c.p.s.); the mark-space combination is represented by 2350 c.p.s. and the space-mark and space-space combinations are represented by 2750 and 3150 c.p.s., respectively.

Heretofore, the signals at the transmitter in both the Twinplex and F.S.K. systems occupied the same frequency band as at the receiver. In Twinplex the four signals are generally separated by 400 c.p.s.; while in F.S.K., they are generally separated by between 300 to 900 c.p.s. The specific separation is usually determined by the limitations of the receiving equipment to distinguish, after discrimination, one signal from another, and the stability of the associated oscillators. Although such signal separation is satisfactory at the receiver for practical signal discrimination, it would be greatly advantageous to space the signals more closely together in frequency at the transmitting end in order to transmit maximum information in the narrowest possible bandwidth.

However, when the transmitted signals are spaced more closely together certain problems arise at the receiving end of the system which are peculiar to the F.S.K. and Twinplex systems.

In the F.S.K. system, only one of two signals is transmitted at any one instant, which represents either the mark or space element of a single channel, and therefore it is comparatively simple, at the receiver, to distinguish between the signals, even when such signals occupy a relatively narrow band. This is because the mark and space signals are on opposite sides of the center frequency and produce at the output of the discriminator positive and negative voltages respectively, which may be amplified and utilized directly. However, when the mark and space signals occupy a narrow band e.g. 100 c.p.s., then the local oscillator at the receiver must be accurately controlled to prevent any drift even approaching 10 c.p.s. Thus, an extremely accurate and very sensitive automatic-frequency-control (A.F.C.) circuit must be employed at the receiver.

In Twinplex a different problem arises when the transmitted signals occupy a narrow frequency band. In Twinplex four signal frequencies, centered about a center carrier frequency, are received at the receiver, and thus the output of the discriminator consists of four levels of direct-current (D.C.) voltage. However, since the signal frequencies are so closely spaced, the two positive D.C. voltages are hardly distinguishable from each other, and similarly for the two negative D.C. voltages. Therefore, if narrow band transmission is to be employed it becomes essential to provide some means at the receiver to distinguish between the various signals.

It is an object of this invention to provide circuit means adapted for F.S.K. and Twinplex receivers, which permits the use of narrow band transmission.

In accordance with a first aspect of the invention, there is provided a communication system comprising means for transmitting and receiving a plurality of different signal frequencies, the signals occupying as a group a narrow-frequency band, and characterized by means at the receiver for converting the signals to occupy a substantially wider frequency band.

In accordance with another aspect of this invention, there is provided a receiver comprising a circuit adapted to convert the band of frequencies to a relatively wide band and to derive from the converted band of signals a frequency control voltage to control the local oscillator of the receiver.

The above-mentioned and other features and objects of this invention and the manner of attaining them will become more apparent and the invention itself will be best understood by reference to the following description of an embodiment of the invention taken in conjunction with the accompanying drawing, in which.

Figure 1:
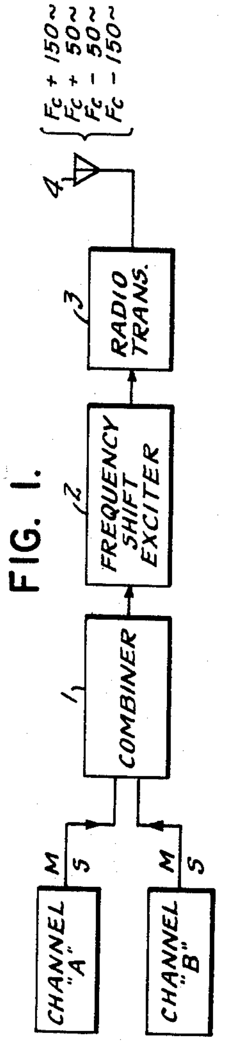
Fig. 1 is a block diagram of a Twinplex transmitter in which the transmitted signal frequencies occupy a relatively narrow band.

Referring to Figure 1, there is illustrated a Twinplex transmitter comprising two channels A and B, each capable of producing a signal for the mark and space elements. The output from the two channels are in the form of D.C. voltages and are multiplexed in a combiner 1 in accordance with known practice. At the output of the combiner, there are four successive D.C. voltages, representing the four possible signal combinations discussed above. The D.C. voltages are applied to a frequency-shift exciter 2 which comprises an oscillator whose frequency varies in accordance with the applied D.C. voltages. Ordinarily, the transmitted frequencies are separated from one another by 400 c.p.s., however, in accordance with the invention they may be separated by 100 c.p.s. or even less. The R.F. frequencies derived from the exciter 2 are then amplified in transmitter 3 for transmission over antenna 4. By way of example, the transmitted frequencies as shown in Figure 1, may be $F_c+150$ c.p.s., $F_c+50$ c.p.s., $F_c-50$ c.p.s. and $F_c-150$ c.p.s., where $F_c$ is the center frequency. In the Twinplex system the carrier frequency may be 20 megacycles.

Figure 2:
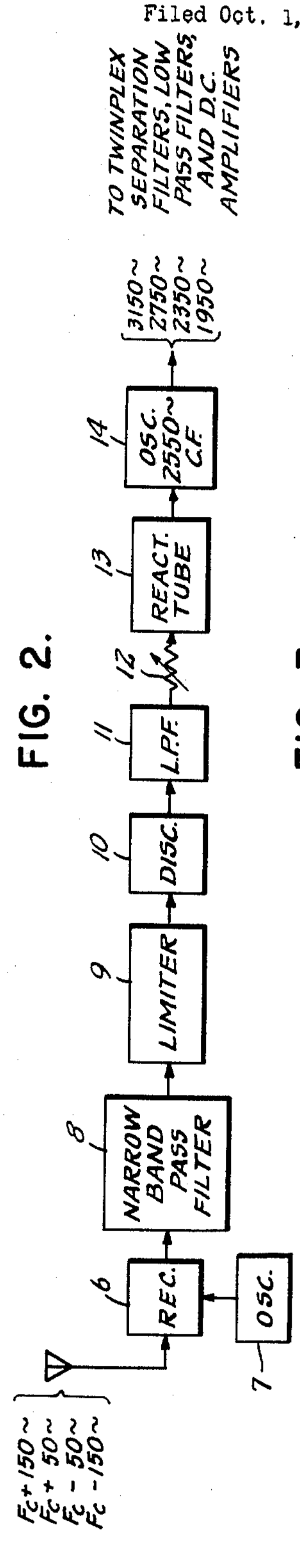
Fig. 2 is a block diagram of a Twinplex receiver illustrating the narrow-to-wide band converter circuit.

Referring to Fig. 2, the Twinplex frequency signals are received at receiver 6, heterodyned with the local oscillations generated by oscillator 7, to produce an intermediate-frequency (I.F.), passed through a narrow band-pass filter 8 and then limited and frequency-discriminated at 9 and 10 respectively. The output of the discriminator 10 is a D.C. voltage, the magnitude and sign of which depends on the frequency deviation from the center frequency $F_c$. Since the frequency deviations are small, the variation in output from the discriminator 10 is correspondingly small and may be of the order of only a few volts, plus and minus for the four frequency combinations. This output is insufficient to be directly separated into two Twinplex keying channels for operating printer equipment (not shown).

In accordance with the invention, the output of the discriminator 10 is filtered by a low pass filter 11 to remove the R.F. ripple, and then applied over an attenuator 12 to a frequency-shift device, e.g. a reactance tube 13. The reactance tube 13 may be of conventional design for linearly varying the frequency of an oscillator 14. The oscillator 14 is preferably tuned to a center frequency in the Twinplex frequency range of 1950 c.p.s. to 3150 c.p.s. If adjacent signals are to be separated 400 c.p.s., as required in the existing Twinplex receiving equipment, then the center frequency is 2550 c.p.s. The oscillator 14 should be linear and the input to the reactance tube should be adjusted by the attenuator 12 so that for the four levels of voltage, corresponding to the four frequency combinations, the reactance tube will modulate the oscillator 14 to generate four respective frequencies separated by 400 c.p.s. In other words, the attenuated discriminator voltage produced by the deviation, $F_c+50$ c.p.s., should bias the reactance tube so that it causes the frequency of the oscillator to generate 2750 c.p.s.; for $F_c-50$ c.p.s., the oscillator should generate a frequency of 2350 c.p.s., and similarly for the other voltages. In this manner the narrow band occupied by the transmitting signals is converted to a relatively wide band, and the Twinplex signals as converted are then applied to respective filters and rectifiers whereby a suitable D.C. voltage is produced to operate the printer.

The function of the attenuator 12 is very important because it controls the amplitude of the signal applied to the reactance tube; the signal amplitude determining the extent of modulation (and therefore frequency swing) produced by the reactance tube.

The invention, thus far, has been described in connection with a Twinplex communication system. However, if we assume the transmitter to be of the F.S.K. type, i.e., only one channel operating and utilizing only two possible signal combinations, then the output of the discriminator 10 may be used after amplification directly to operate the printer. As briefly discussed above, this is because it is relatively simple to detect and distinguish the character of the received mark and space signals, particularly when one is positive and the other negative.

Figure 3:
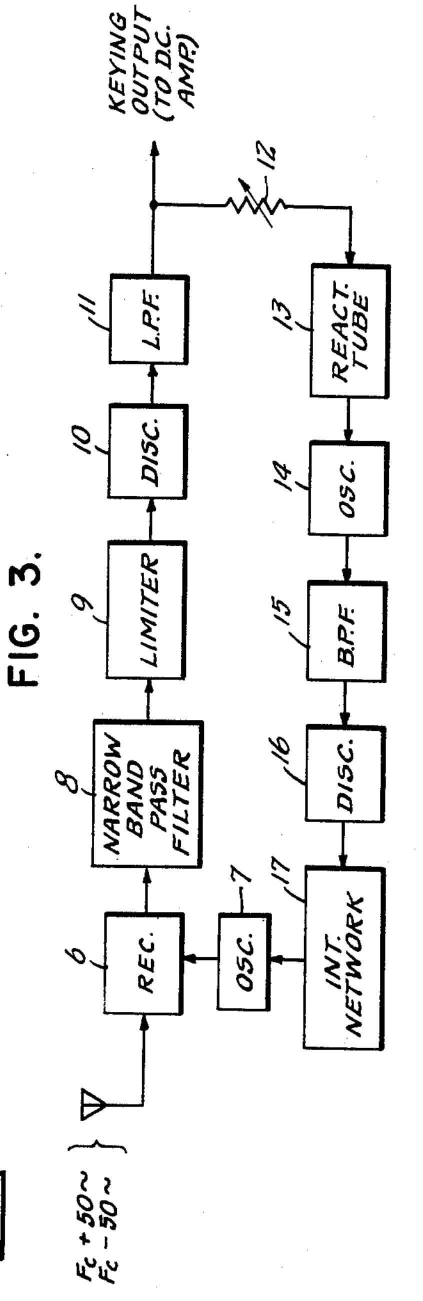
Fig. 3 is a block diagram of a F.S.K. receiver illustrating the narrow-to-wide band converter circuit as utilized to develop the A.F.C. control voltage.

Referring now to Figure 3, there is illustrated a portion of a typical F.S.K. receiver, including the novel A.F.C. circuit constituting another embodiment of the invention. As shown in the figure, the receiver is adapted to receive two carrier signals separated by 100 c.p.s. or less. The signals, as in Twinplex reception, are applied to the discriminator 10, which develops either a positive or negative D.C. voltage, depending on the direction of signal excursion from the carrier frequency. The R.F. ripple is removed from the discriminator output by the low pass filter 11, and then unlike Twinplex, amplified and utilized directly to operate the printer. However, although the signals may be used directly, it is imperative that the local oscillator 7 be controlled precisely because of the narrow spacing of the different signal frequencies. For example, if a carrier of 20 megacycles is used, the local oscillator frequency may be 19.55 mc., and yet it must be so controlled as to prevent a drift even approaching 10 c.p.s.

In accordance with the invention, a portion of the output signal is applied to the A.F.C. circuit over an attenuator 12; which carries the same function as the attenuator discussed in connection with Fig. 2. The attenuated D.C. voltages represent the deviation from the center frequency of the carrier signal and also any drift which may have been introduced by oscillator 7. These voltages are applied to a reactance tube 13 which is capable of producing a wide frequency swing in oscillator 14. The result of this wide frequency swing from the center frequency of oscillator 14 permits the development of a control voltage. Either or both of the modulated oscillations from oscillator 14 may be used in the development of the control voltage, however, one frequency has been found generally adequate for this purpose. The unwanted frequency is blocked by band pass filter 15 and the desired frequency is applied to discriminator 16. The discriminator 16 is tuned to a frequency corresponding to the desired frequency generated by oscillator 14, when there is no drift in the local oscillator 7. Thus, if there is no undesirable drift in the local oscillator 7, then no voltage will be developed by the oscillator 7, then no voltage will be developed by the discriminator 16. However, any drift in the local oscillator results in the discriminator 16 producing a D.C. voltage, which is integrated at 17 and applied to the local oscillator 7 as a control voltage. Thus, the effect of narrow-to-wide band conversion is to produce a control voltage many times greater than would be possible if the output of discriminator 10 were employed directly for such purpose. For example, if attenuator 12 is adjusted to produce a shift of 800 c.p.s. on oscillator 14 with received signal shift of 100 c.p.s., then one cycle shift in the latter produces 8 cycles shift from oscillator 14. Consequently the precision of holding in oscillator 7 is increased by a factor of eight times over conventional A.F.C.

While I have described above the principles of my invention in connection with specific apparatus, it is to be understood that this description is made only by way of example and not as a limitation to the scope of my invention as set forth in the objects thereof and in the accompanying claims.

What is claimed is:

1. A receiver for receiving at least four discrete signals of respectively different frequencies occupying a narrow frequency band and converting such signals to occupy a relatively wider frequency band, comprising heterodyning means for converting said signals to a corresponding number of intermediate frequencies, a frequency discriminator coupled to the output of said heterodyning means and tuned to a center frequency of the intermediate frequencies, whereby the output of said frequency discriminator consists of four direct-current voltages whose amplitudes are representative of the difference between the center frequency and the respective intermediate frequencies, a reactance tube coupled to the output of said frequency discriminator and an oscillator tuned to a given frequency coupled to the output of said reactance tube, the reactance tube being adjusted to modulate said oscillator to produce relatively wide swings in frequency in response to the four levels of voltage applied to said reactance tube, the generated frequencies occupying a substantially wider frequency band than the received signals, a plurality of signal separating circuits and means coupling the output circuit of said oscillator to said signal separating circuits.

2. The system according to claim 1 and further comprising an attenuator coupled between the output of said discriminator and the input of said reactance tube, for controlling accurately the amplitude of the voltage applied to said frequency-shift device.

3. A receiver for a frequency-shift telegraphy system, adapted to receive at least two signals of respectively different frequencies occupying a relatively narrow frequency band, comprising a local oscillator, means for heterodyning the received signals with the oscillations generated by said local oscillator to produce a corresponding number of intermediate frequency waves, a frequency discriminator tuned to a center frequency of said intermediate frequencies, means for applying said intermediate frequency waves to said frequency discriminator, the output of said frequency discriminator consisting of two direct-current voltages representative of the difference between the center and respective intermediate frequencies, including spurious local oscillator drift, a reactance tube coupled to the output of said frequency discriminator, an oscillator tuned to a given frequency and coupled to the output of said reactance tube, the reactance tube being adjusted to modulate said oscillator in response to the levels of said two direct-current voltages to produce, respectively, waves occupying a substantially wider frequency band than the received signals, means to suppress an undesired one of said waves of substantial wider frequency and to pass the wave of desired frequency, a second frequency discriminator tuned to the desired frequency wave, means for applying said desired frequency wave to said second frequency discriminator, the output thereof consisting of a direct-current control voltage of an amplitude representative of the degree of local-oscillator drift, and means applying said control voltage to said local oscillator for the frequency control thereof.

4. The system according to claim 3 and further comprising an attenuator coupled between the output of said discriminator and the input of said reactance-tube, for controlling accurately the amplitude of the voltage applied to said reactance tube.

5. A system for receiving a plurality of discrete frequency signals having a frequency excursion on opposite sides of a center frequency which excursion is of narrow width, comprising a frequency discriminator, means applying said signals to said discriminator to produce in the output thereof direct current voltages of amplitudes respectively representing said discrete signals, an oscillator tuned to a given frequency, a frequency shift device coupled between said oscillator and the said discriminator output, means to adjust said device to produce output signals from said oscillator respectively representing said discrete signals but with a frequency excursion which is substantially wider than the said excursion of said discrete signals, and a plurality of signal separating circuits connected between the output of said oscillator and a signal utilization device.

References Cited in the file of this patent

UNITED STATES PATENTS

| | | |
|---|---|---|
| 2,145,138 | Saylor | Jan. 24, 1939 |
| 2,316,017 | Peterson | Apr. 6, 1943 |
| 2,341,649 | Peterson | Feb. 15, 1944 |
| 2,527,523 | Borst | Oct. 31, 1950 |